(12) United States Patent
Stow (10) Patent No.: US 7,337,885 B2
(45) Date of Patent: Mar. 4, 2008

(54) TELESCOPING CYLINDER

(75) Inventor: Mark Stow, Indianapolis, IN (US)

(73) Assignee: SMC Corporation of America, Indianapolis, IN (US)

( * ) Notice: Subject to any disclaimer, the term of this patent is extended or adjusted under 35 U.S.C. 154(b) by 141 days.

(21) Appl. No.: 11/024,190

(22) Filed: Dec. 28, 2004

(65) Prior Publication Data

US 2006/0137946 A1  Jun. 29, 2006

(51) Int. Cl.
*F16F 9/34* (2006.01)

(52) U.S. Cl. .................. 188/322.15; 188/316; 188/289; 91/189 A (58) Field of Classification Search ........... 188/322.13, 188/322.15, 282.1, 319.1; 267/64.22
See application file for complete search history.

(56) References Cited

U.S. PATENT DOCUMENTS

| | | |
|---|---|---|
| 159,829 A | 2/1875 | LeVan |
| 625,425 A | 5/1899 | Sonnex |
| 995,045 A | 6/1911 | Talley |
| 1,095,926 A | 5/1914 | Powell |
| 1,208,854 A | 12/1916 | Stitt |
| 1,253,630 A | 1/1918 | Biker |
| 1,416,299 A | 5/1922 | Kline |
| 1,511,868 A | 10/1924 | Asbury |
| 1,603,860 A | 10/1926 | Midgley |
| 1,685,697 A | 9/1928 | Guerin |
| 1,717,485 A | 6/1929 | Wirz |
| 1,718,088 A | 6/1929 | Stuver |
| 1,928,533 A | 9/1933 | Goss |
| 2,565,730 A | 8/1951 | Johnston et al. |
| 2,570,362 A * | 10/1951 | Mercier .................. 188/282.7 |
| 2,803,224 A | 8/1957 | Wilson |
| 2,834,256 A | 5/1958 | Wertman |
| 2,854,958 A | 10/1958 | Wood et al. |
| 2,910,049 A | 10/1959 | Calder |
| 3,000,625 A | 9/1961 | Polhemus |
| 3,541,928 A | 11/1970 | Conwell et al. |
| 3,653,302 A | 4/1972 | Notenboom |
| 3,687,015 A | 8/1972 | Chavarria |
| 3,720,260 A | 3/1973 | Duck et al. |
| 3,877,349 A | 4/1975 | Schindel |
| 4,002,211 A | 1/1977 | Holland |
| 4,056,043 A | 11/1977 | Sciramamurty et al. |
| 4,185,288 A | 1/1980 | Dosch et al. |
| 4,290,495 A | 9/1981 | Elliston |
| 4,339,989 A | 7/1982 | Webster |
| 4,852,464 A | 8/1989 | Bartmann et al. |
| 4,991,493 A | 2/1991 | Luojus |
| 5,078,447 A | 1/1992 | Klein et al. |
| 5,263,402 A | 11/1993 | Gottlieb |

(Continued)

FOREIGN PATENT DOCUMENTS

GB  807068  1/1959

(Continued)

*Primary Examiner*—Melody M. Burch
(74) *Attorney, Agent, or Firm*—Bose McKinney & Evans LLP (57) ABSTRACT

A telescoping fluid cylinder having an inner rod and outer rod moving between extended and retracted positions. A first piston and second piston move the outer rod and inner rod through the cylinder in which a valve of the first piston provides for independent movement of the inner rod and outer rod.

5 Claims, 11 Drawing Sheets

U.S. PATENT DOCUMENTS

| | | | | |
|---|---|---|---|---|
| 5,320,375 A | * | 6/1994 | Reeves et al. | 280/284 |
| 5,341,724 A | | 8/1994 | Vatel | |
| 5,692,429 A | * | 12/1997 | Sonntag | 91/395 |
| 6,138,776 A | | 10/2000 | Hart et al. | |
| 6,279,703 B1 | * | 8/2001 | Mete | 188/319.1 |
| 6,360,857 B1 | * | 3/2002 | Fox et al. | 188/281 |
| 6,450,083 B1 | | 9/2002 | Dawson | |
| 6,526,865 B2 | | 3/2003 | Weedon | |
| 2003/0167916 A1 | | 9/2003 | Dohallow | |

FOREIGN PATENT DOCUMENTS

| | | |
|---|---|---|
| GB | 831685 | 3/1960 |
| GB | 846962 | 9/1960 |
| GB | 1 355 313 | 6/1974 |
| GB | 2 028 189 | 5/1980 |
| GB | 2 077 809 | 12/1981 |
| GB | 2 240 519 | 8/1991 |
| WO | WO9319279 | 9/1993 |
| WO | WO9412395 | 6/1994 |
| WO | WO9618021 | 6/1996 |
| WO | WO9856612 | 12/1998 |

* cited by examiner

TELESCOPING CYLINDER

BACKGROUND

Current manufacturing processes rely on the efficient assembly of parts to create products in a wide variety of industries. To facilitate this assembly of parts, repetitive operations are identified and automated where possible. For instance, welding operations are automated where identical parts are welded to identical pieces or assemblies during the manufacturing process. In some instances, the identical parts are selected, placed, and held to the assembly by one or more devices that automate these repetitive tasks.

Many of these devices use fluid cylinders to perform the repetitive tasks. Such fluid cylinders include hydraulic cylinders and pneumatic cylinders. Pneumatic cylinders typically include a piston and a rod within a housing moved by the force of pressurized air. In some cases, a tool is attached to the rod which is moved axially through the cylinder towards a bin containing parts. The tool includes an interface which interacts or mates with the part. This interface can include, for instance, a magnetic interface, a vacuum interface, or fitted interface. The interface is moved to the bin through the application of air to the cylinder. The part is selected and removed from the bin and then moved to the assembly being manufactured.

Pneumatic cylinders are known to include a cylinder housing, a rod, and an actuating piston. The rod moves between extended and retracted positions relative to the cylinder housing which includes a longitudinal axis and an outer surface. The actuation piston, which is coupled to the rod, moves the rod between the extended and retracted positions upon the application of air pressure to one or more air ports.

It is also known for a pneumatic cylinder to include a cylinder housing with a rod cover and a head cover. The head cover, located at one end of the pneumatic cylinder, includes an extend air port for directing pressurized air to the interior of the cylinder. A rod cover, located at an opposite end of the cylinder cover, includes a retract air port and an aperture to receive a rod assembly. The rod assembly includes an outer rod and an inner rod located within a channel of the outer rod. During operation, application of pressurized air to the extend air port, moves the outer rod in the longitudinal direction to extend the outer rod from the cylinder housing. Upon further application of air pressure to the extend pressure port, the inner rod moves within the channel of the outer rod, such that the inner piston rod extends from a stationary outer rod. Typically, a tool is coupled to the inner rod to select a part for the manufacturing operation. Once selected, the air pressure is removed from the extend pressure port and applied to the retract pressure port. The inner rod moves into the outer rod and the selected part is removed from the tool through contact with the outer rod. In some cases, the outer rod may press the part into place.

The outer rod is coupled to a first piston located within the cylinder housing. An outer surface of the first piston contacts an inner surface of the cylinder housing and moves in the longitudinal direction upon application of air pressure to the extend air pressure port. The inner rod is coupled to a second piston located within a cavity of the first piston. The second piston is contained within the cavity of the first piston during its entire travel. The second piston also includes push back pins which extend through the first piston and contact the rod cover. Pressurized air, passing through the extend pressure port, is directed to both the first and second piston at the same time. The outer rod continues to move with respect to the inner rod once the push back pins contact the rod cover. This movement of the outer rod with respect to the inner rod, removes the part from the tool and in some cases pushes the part to a desired location.

Because the second piston is located within the first piston at all times and the extend pressure port is open to both pistons, the breakaway force of the first piston with respect to the cylinder and the breakaway force of the second piston with respect to the first piston are selected to be different. A first piston seal of the first piston includes a first breakaway force between the cylinder and the first piston. A second piston seal of the second piston includes a second breakaway force between the second piston and the cavity of the first piston. The first piston seal force is adjusted to be less than the second piston seal force so that the inner piston can move independently of the outer piston.

SUMMARY OF THE INVENTION

The present invention relates to fluid cylinders. More particularly, the present invention relates to telescoping fluid cylinders.

In accordance with one aspect of the present invention there is provided, a fluid cylinder including a housing, a first rod having a channel and a second rod. The first rod is configured to move between an extended and a retracted position relative to the housing. The second rod is located within the channel wherein the second rod is configured to move between an extended and a retracted position relative to the first rod. A first piston is coupled to the first rod. The first piston includes a cavity, and a valve located within the cavity, and is adapted to move between an open and a closed position to enable the second rod to move relative to the first rod.

Pursuant to another aspect of the present invention, there is provided a fluid cylinder including a housing and a first piston, including a cavity, disposed within the housing and a second piston, disposed within the housing. A valve is located within the cavity of the first piston and is adapted to move between an open and a closed position to enable the second piston to move relative to the first piston.

An additional aspect of the invention is a fluid cylinder including a housing having an interior region having a first dimension, a cover, including a cavity having a second dimension less than the first dimension, coupled to the housing, a first piston disposed within the housing, and a second piston disposed within the housing. The first piston includes a dimension to prevent the second piston from being disposed within the first piston.

DETAILED DESCRIPTION OF THE DRAWINGS

Figure 1:
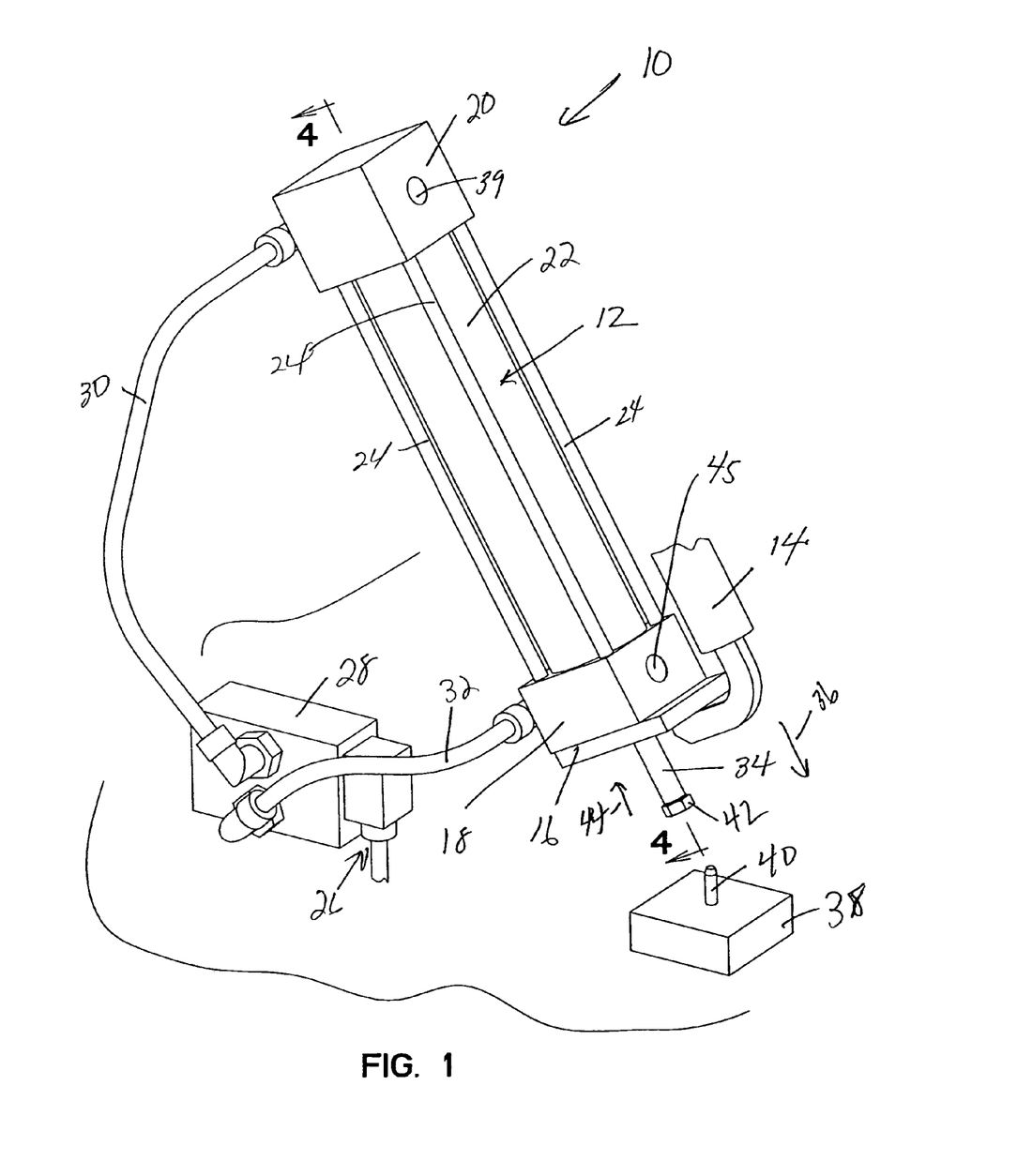
FIG. 1 is a perspective view of an assembly apparatus including a telescoping cylinder.

FIG. 1 illustrates a perspective view of an assembly apparatus 10 including a telescoping cylinder 12. The assembly apparatus 10 includes a support structure 14 which is coupled to the cylinder 10 through a flange 16. The flange 16 is attached to a rod cover 18 which is disposed at one end of the cylinder 12. Disposed at an opposite end of the cylinder 12 is a head cover 20 which is coupled to the rod cover 18 through a cylinder housing 22. The housing 22 is inserted into an aperture of the rod cover 18 and in an aperture of the head cover 20. The rod cover 18, head cover 20 and cylinder 22 are held together by a plurality of threaded rods 24 which insert into threaded apertures of the respective rod cover 18 and head cover 20.

During operation, the cylinder 12 is coupled to an air source (not shown) through an air source coupler 26 which conducts the air through a switch block 28. The switch block 28 directs air either through a first line 30 coupled to the head cover 20 or through a second line 32 coupled to the rod cover 18. During operation of the assembly apparatus 10, air is supplied through the first line 30 to the telescoping cylinder 12 to move an outer rod 34 in a direction 36 towards a work table 38. The amount of air pressure used to move the rod 34 in direction 36 is controlled by an adjustable flow control valve accessible through an aperture 39. The work table 38 includes a post 40 upon which a work piece or, in this case, a nut 42, is placed. Once the nut 42 is placed upon the post 40 through the action of the rod 34 extending in the direction 36, the switch block 28 redirects the air from the line 30 to the line 32 such that the outer rod 34 is moved in a direction 44 away from the work table 38. The amount of air pressure used to move the rod 34 in the direction 44 is controlled by an adjustable floor control valve accessible through an aperture 45. In this fashion, the repetitive operation of placing the nut 42 on the table 38 can be accomplished where certain manufacturing operations can be performed, such as welding.

Figure 2A:
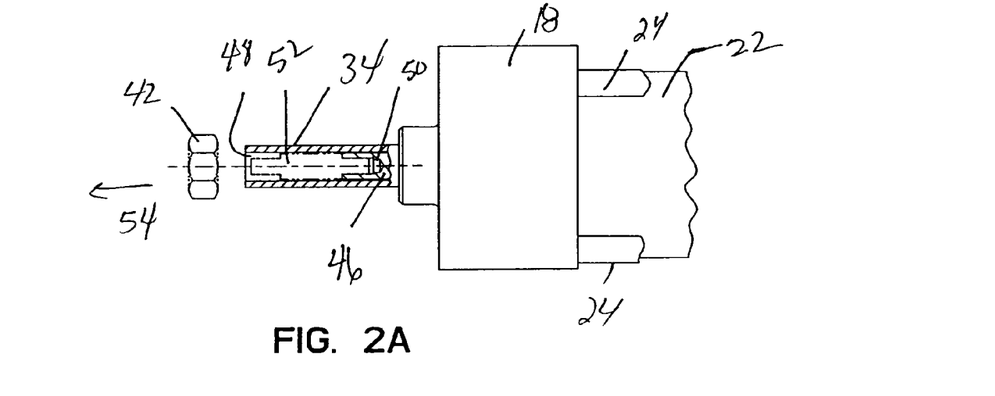
FIGS. 2A-2C are diagrammatic views of the telescoping cylinder of FIG. 1 including a sectional view of an outer rod and inner rod using a tool to select a part.
Figure 2B:
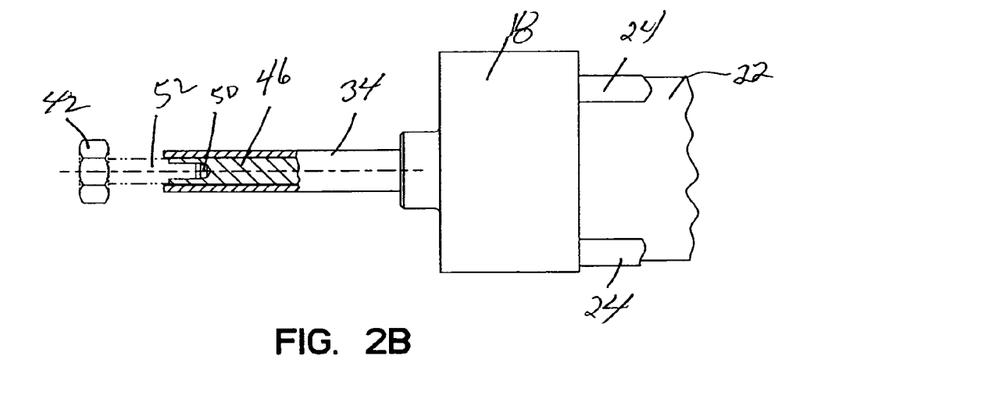
Figure 2C:
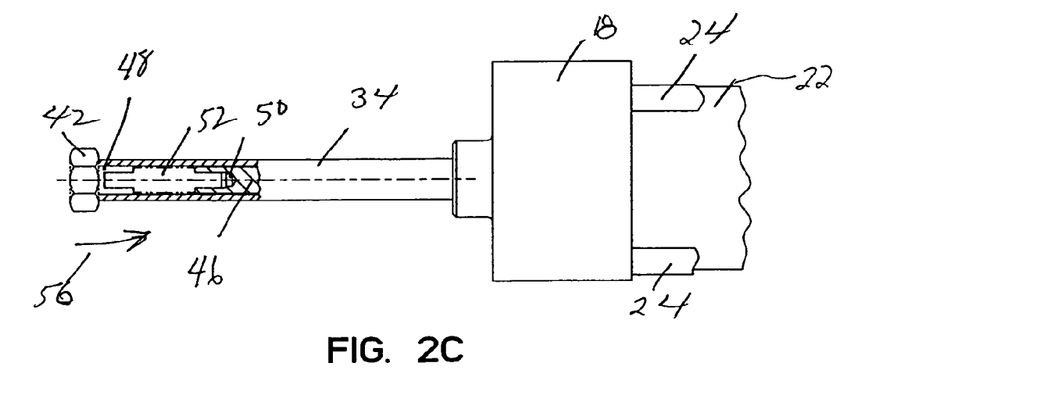

FIGS. 2A-2C are diagrammatic views of the telescoping cylinder 20 of FIG. 1 including a sectional view of the outer rod 34 and an inner rod 46 disposed within a channel 48 of the outer rod 34. The inner rod 46 includes an attachment feature 50, such as a threaded aperture, to which a tool 52 can be attached. During operation of the cylinder 20, the inner rod 50 is moved through the channel 48 in a direction 54. The inner rod 46 extends from the cylinder 20 in the direction 54 before the outer rod 34 moves in the direction 54. As can be seen in FIG. 2B, once the inner rod 46 reaches the extent of its travel within rod 34, the outer rod 34 and inner rod 46 extend along the direction 54 together. At the end of travel of both the outer rod 34 and the inner rod 46, the tool 52 is extended to a work piece, or nut in this case, where it is picked up by the tool 52. The tool 52 can include a magnetic device or other tool which includes an attachment feature for attaching to the work piece being selected and moved.

At some point during the manufacturing operation, the cylinder 20 is moved to a location where the work piece is removed from the tool 52 by retracting the inner rod 46 back into the cylinder 20 when the work piece contacts the outer rod 34. As can be seen in FIG. 2C, the action of the inner rod 46 moving in a direction 56 causes the work piece to fall from the tool 52 due to the interaction between the outer rod 34 and workpiece 42. Upon further application of the air pressure through the line 32, as illustrated in FIG. 1, both the outer rod 34 and inner rod 46 are returned to their original starting position as illustrated in FIG. 2A.

Figure 3A:
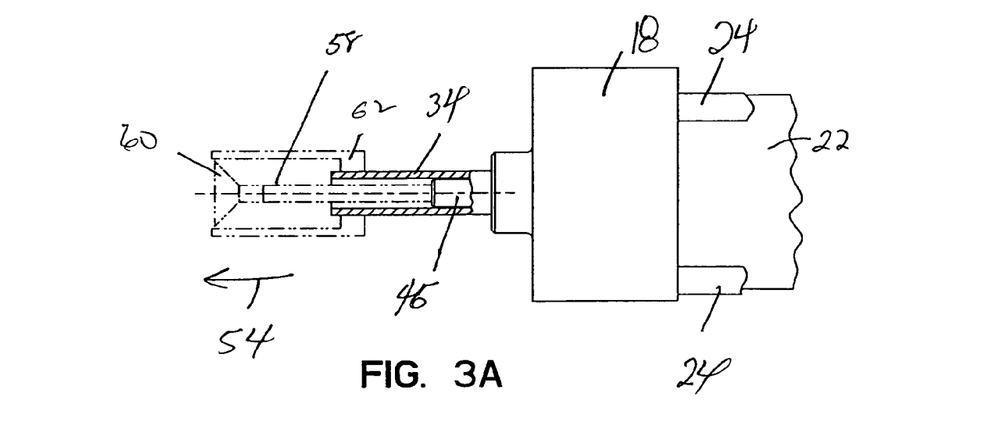
FIGS. 3A-3C are diagrammatic views of the telescoping cylinder of FIG. 1 including a sectional view of an outer rod and inner rod using a vacuum tool to select a part.
Figure 3B:
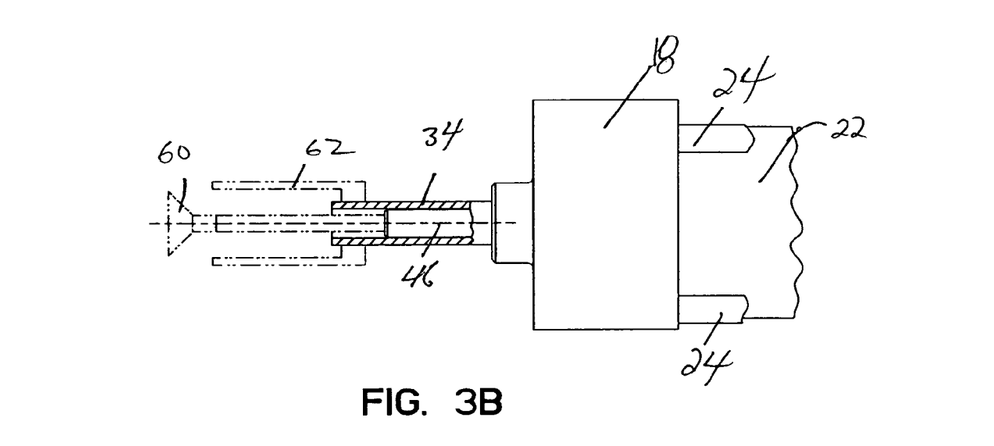
Figure 3C:
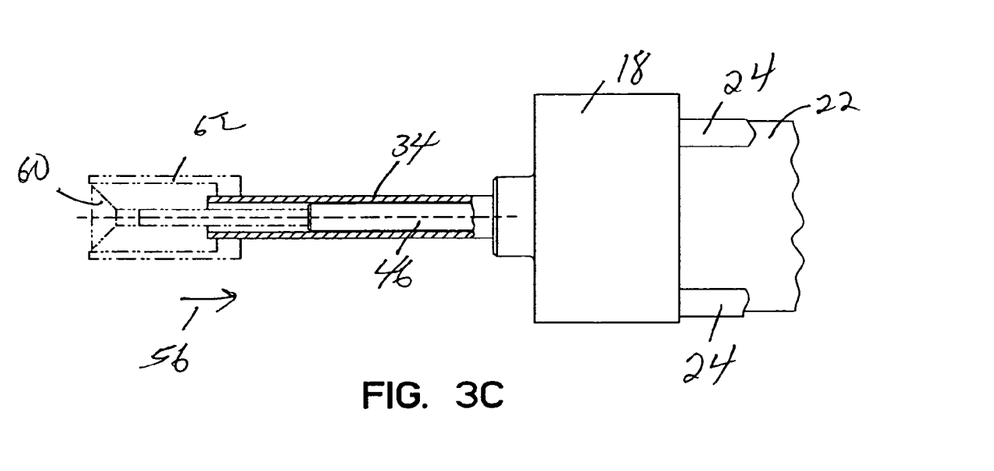

FIGS. 3A-3C are diagrammatic views of the telescoping cylinder 20 of FIG. 1 including a sectional view of the outer rod 34 and inner rod 46 where the inner rod 46 is formed to include a channel, not shown. In the embodiment of FIGS. 3A-3C, a vacuum tool 58 is attached to the inner rod 46 such that the channel within the inner rod 46 is coupled to a channel within the vacuum tool 58. The vacuum tool 58 includes a flexible cup 60 which supplies a vacuum to a work piece for picking or selecting the work piece. As previously illustrated in FIGS. 2a-2c, the inner rod and outer rod cooperate to pick up a work piece and to remove a work piece from the vacuum cup 60. The work piece is removed from the vacuum cup 60 with a removal tool 62. In addition to the tool 62 forcing the work piece from the vacuum cup 60 through retraction of the inner rod 46, the vacuum applied through the vacuum tool 58 can also be either reduced or completely eliminated for the removal of the workpiece.

Figure 4:
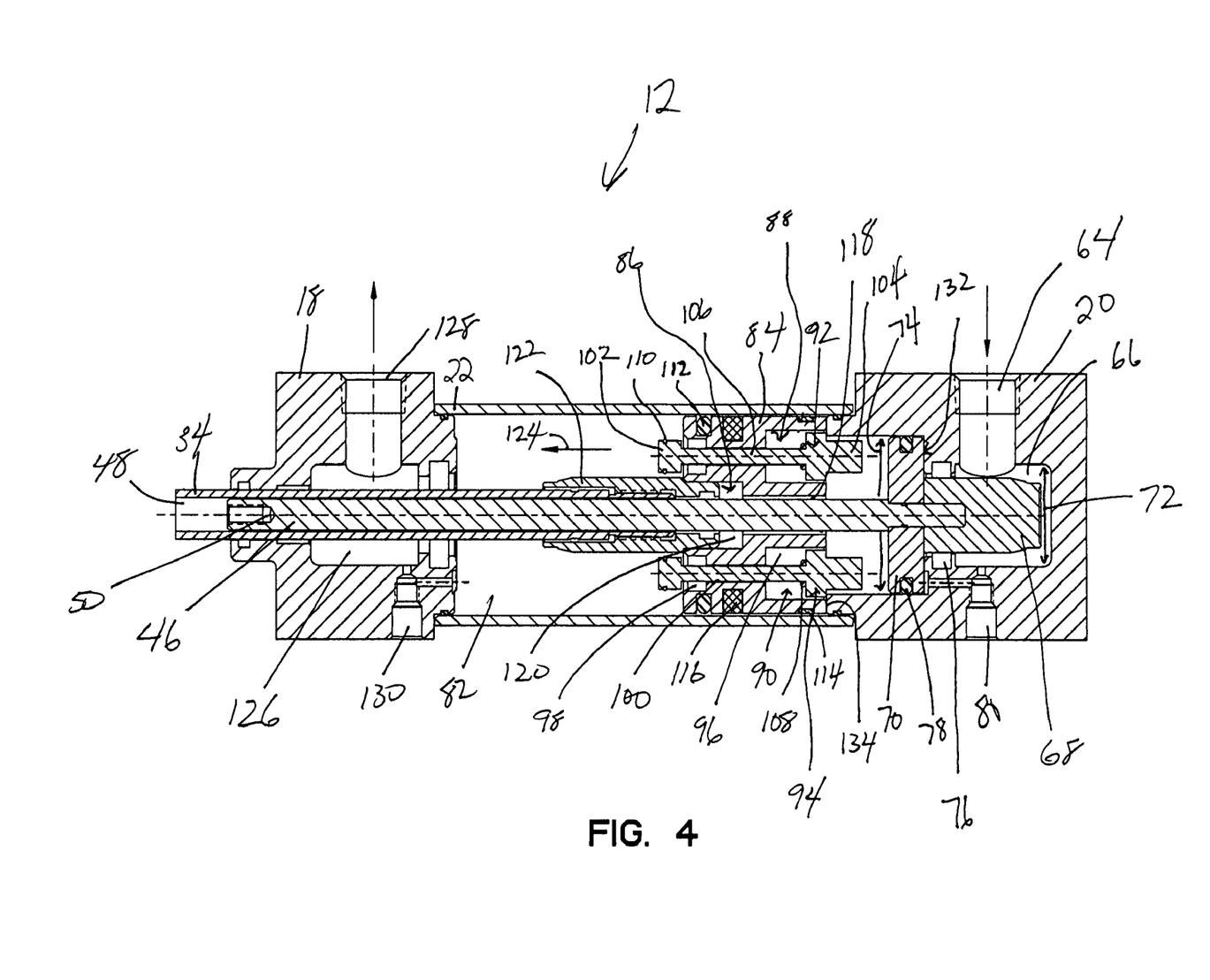
FIG. 4 is a sectional elevational view along the line 4-4 of the cylinder at a start position along the line of 4-4 of FIG. 1.
Figure 5A:
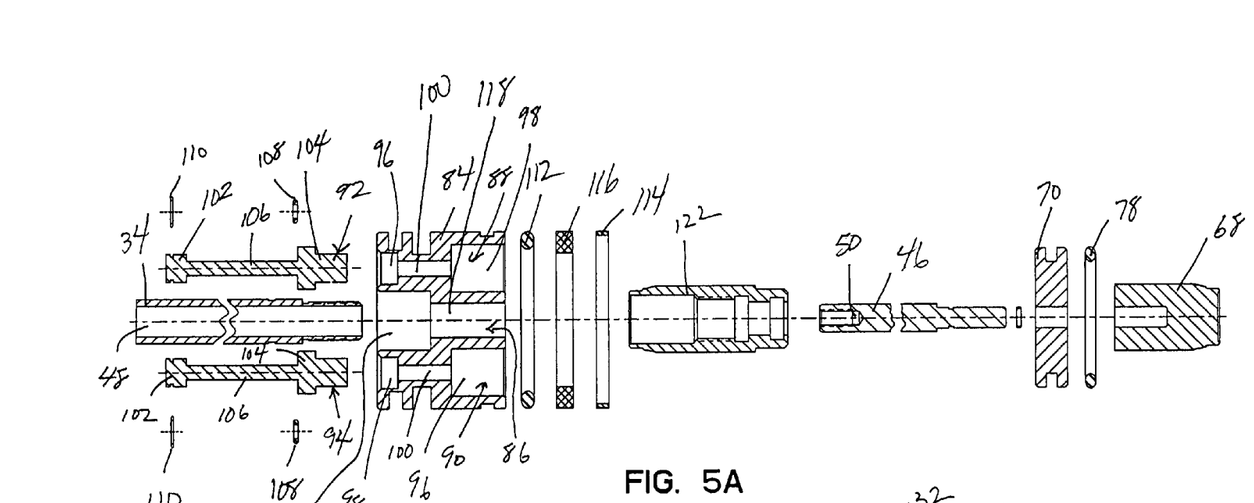
FIG. 5 is an exploded view of the cylinder of FIG. 4.
Figure 5B:
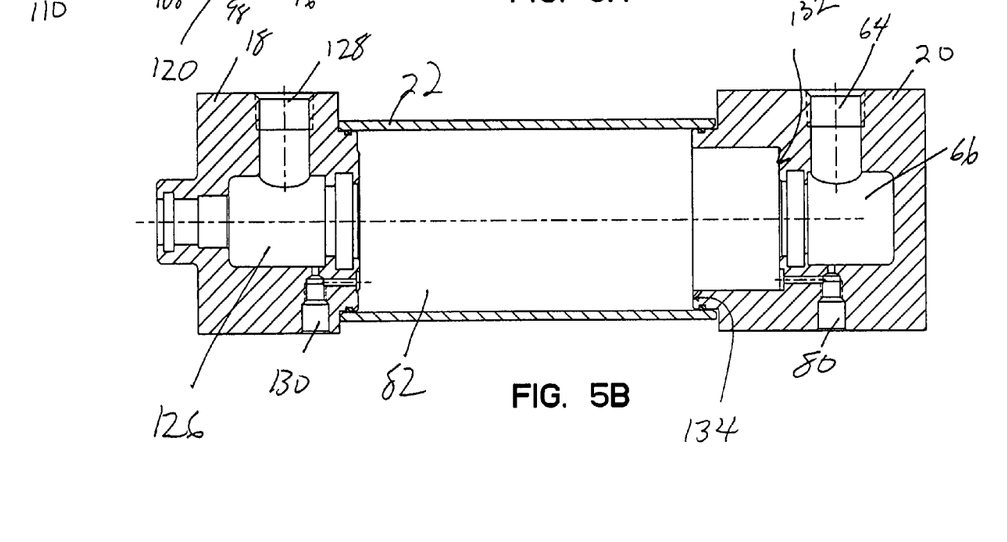

FIG. 4 illustrates a sectional elevational view along the line 4-4 of the cylinder 12 of FIG. 1 at a start position. FIG. 5 also illustrates the cylinder 12 in an exploded view. The head cover 20 includes an extend air port 64 coupled to the line 30 as shown in FIG. 1. Upon application of air to the port 64, the air enters a cavity 66 located within the head cover 20. Disposed within the cavity 66 is an inner piston cushion ring 68 and an inner piston 70 both of which are coupled to the inner rod 46. As can be seen in FIG. 4, the cavity 66 includes a first dimension 72 in which the inner piston cushion ring 68 is initially located and a second dimension 74 in which the inner piston 70 is initially located. To provide for smooth operation of the cushion ring 68 and the piston 70, a cushion seal 76 and an inner piston seal 78 are provided. The head cover 20 also includes a flow control valve 80 to thereby adjust the flow of air received through the port 64 as would be understood by one skilled in the art.

The cylinder 12 includes an interior region 82 which is defined by the cylinder housing 22. Disposed within the interior region 82 is an outer piston 84 which includes a piston rod cavity 86 through which the rod 46 travels. The outer piston 84 further includes a first valve or poppet cavity 88 and a second valve or a poppet cavity 90. Each of the cavities 88 and 90 respectively receive a first poppet 92 and a second poppet 94. As can be seen in FIG. 4, each of cavities 88 and 90 are defined to include a first chamber 96 and a second chamber 98 which are coupled by a passageway 100 where only the cavity 90 has been provided with element number 96, 98, 100 for purposes of illustration.

Each of the valves 92 and 94 are typically constructed to include substantially the same shape such that a front portion 102 is coupled to a rear portion 104 by a shaft 106. Other valve configurations are possible. The rear portion 104 is formed to be received within the first chamber 96 and the front portion is formed to be received within the second chamber 98. The inner surfaces of the cavities 96 and 98 cooperate with the respective front portion 102 and rear portion 104. The shaft 106 is located in the passageway 100. To accommodate proper sealing of the valves 92 and 94, each valve includes a shaft seal 108 located around the shaft and a valve seal 110 located within a groove formed in the front portion 102. Likewise, to accommodate free and constant movement of the outer piston 84 through the interior region 82, an outer piston seal 112 and a wear ring 114 are provided about the circumference thereof. An optional magnet or magnetic ring 116 is also disposed around the outer piston 84 when desired. The magnet 116 is an indicator, provided to indicate the location of the outer piston 84 within the interior region 82 such that the application of air through the lines 30 and 32 can be properly sequenced for controlling the cylinder 12.

The rod cavity 86 includes a first portion 118 through which the inner rod 46 travels and a second portion 120 in which a outer rod cushion ring 122 is attached to the outer piston 84. The outer rod cushion ring 122 is likewise coupled to the outer rod 34 such that movement of the outer piston 84 along a line 124 moves the attached rod 34. The outer rod cushion ring 122, however, does not contact the inner rod 46 so that the inner rod 46 can move freely through the outer piston 84 as well as through the channel 48 of the outer rod 34. The rod cover 18 includes a rod cover cavity 126 which not only receives the outer rod 34 but also allows for the release of pressure for the exhaustion of air from the interior region 82 of the cylinder during operation of the cylinder. The cavity 126 defines a rod cover air port 128 which exhausts air from the interior region of the cylinder 22, and which is coupled to the line 32. The rod cover 18 also includes a flow control valve 130.

FIG. 5 illustrates an exploded view of the cylinder FIG. 4. While FIGS. 4 and 5 illustrate a variety of seals, wear rings, and o-rings, the remaining figures only illustrate these features when appropriate.

Referring now to FIG. 4, FIG. 4 illustrates the start or beginning position of the cylinder 12. The outer piston rod 34 and inner piston rod 46 are completely retracted within the cylinder 12. The inner piston 70 is seated against or flush with a wall 132 of the head cover 20. The outer piston 84 is seated or flush with a surface 134 of the head cover 20. The poppet 92 and 94 and in an open position such that the first chambers 96 and second chambers 98 are open. The illustration of FIG. 4 particularly illustrates the point at which no air pressure has been applied to the port 64. In this position, the poppets 92 and 94 are positioned such that air can pass through the cavities 88 and 90 of the outer piston 84. As can be seen from this drawing, the inner piston 70 is designed such that it is larger than the cavities of the outer piston 84 and therefore the inner piston 70 does not enter into any aperture or portion of the outer piston 84. In this case, the inner piston 70 and outer piston 84 are independent.

Figure 6:
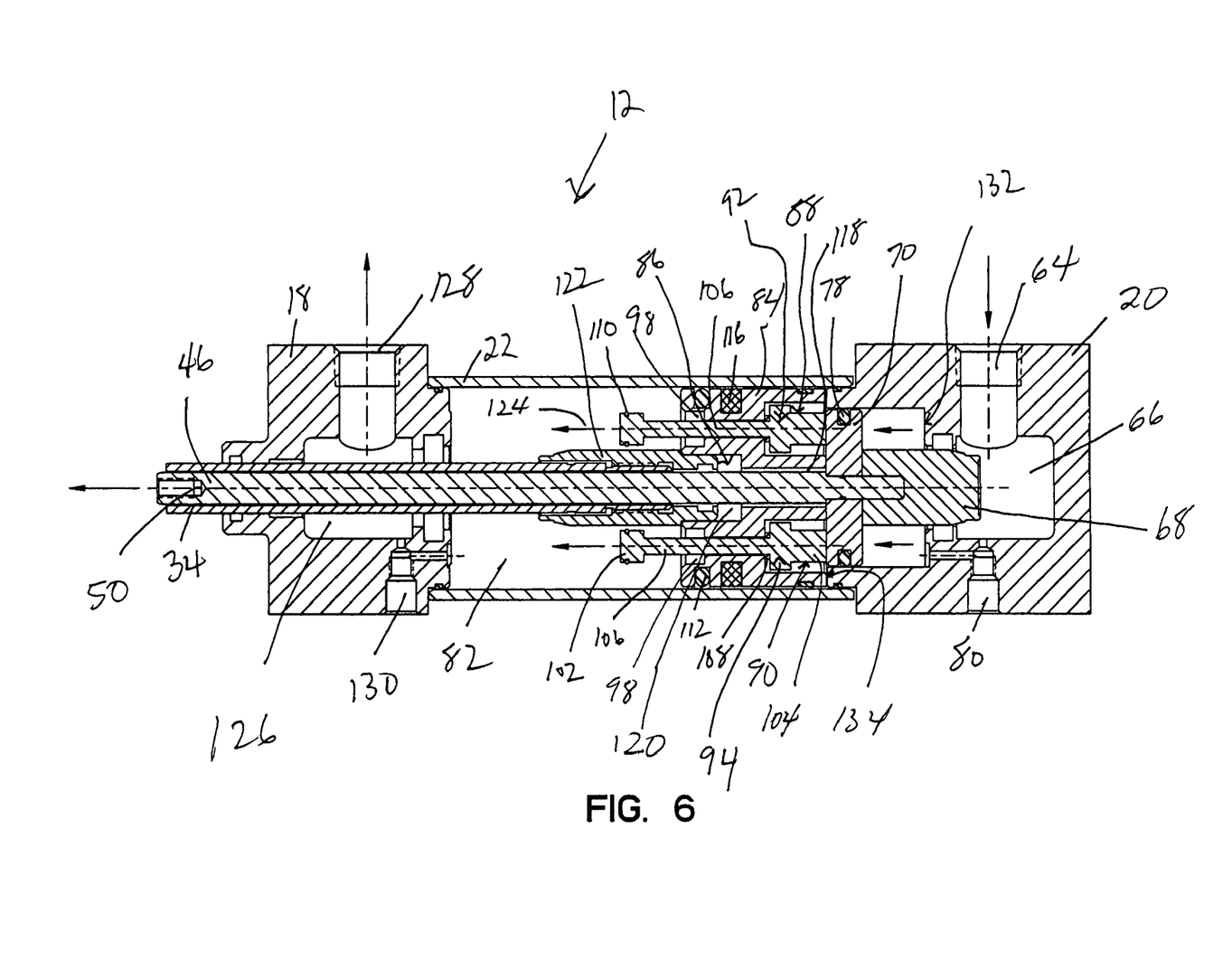
FIG. 6 is a sectional elevational view of the cylinder of FIG. 4 upon the initial application of air pressure to the head cover.

FIG. 6 is a sectional elevational view of the cylinder 20 upon the initial application of fluid pressure or air to the head cover 20 through the port 64. Since the inner piston 70 is within the cavity 66, and the inner piston seal 78 contacts the inner surface of the cavity 66, the fluid pressure applied through port 60 affects only the inner piston 78 to push the inner piston 78 forward which in turn pushes the rod 46 forward as well. Since the inner piston 70 and the outer piston 84 are independent, the air pressure applied through port 64 affects only the forward movement of the inner piston 70 until the seal between the inner piston 70 and the head cover cavity 66 is opened. Once the fluid pressure applied to the inner piston 70 moves the inner piston 70 forward, the inner piston contacts the outer piston 84 to start movement of the outer piston 84 in the forward direction along the line 124. The contact between the inner piston 70 and the outer piston 84 occurs before the inner piston seal loses contact with the head cover cavity 66. This design ensures that no applied air pressure affects the outer piston 84 until the inner piston has completed its designed travel. As soon as the inner piston 70 contacts the outer piston 84, the inner piston applies force to move the outer piston.

As the inner piston 70 moves forward, the air in front of the inner piston 70 begins to flow through the first valve cavity 88 and second valve cavity 90 around the poppet shaft 106, through the second chambers 98 and out through the exhaust at the port 128. As the inner piston 70, contacts the outer piston 84, the poppet seals 108 close the cavities 88 and 90 thereby closing off the air path through the outer piston 84. The poppets 92 and 94, the poppet seals 108, and the poppet cavities 88 and 90, control the air flow across and through the outer piston 84 thereby closing off the air paths which previously existed through the outer piston 84.

Figure 7:
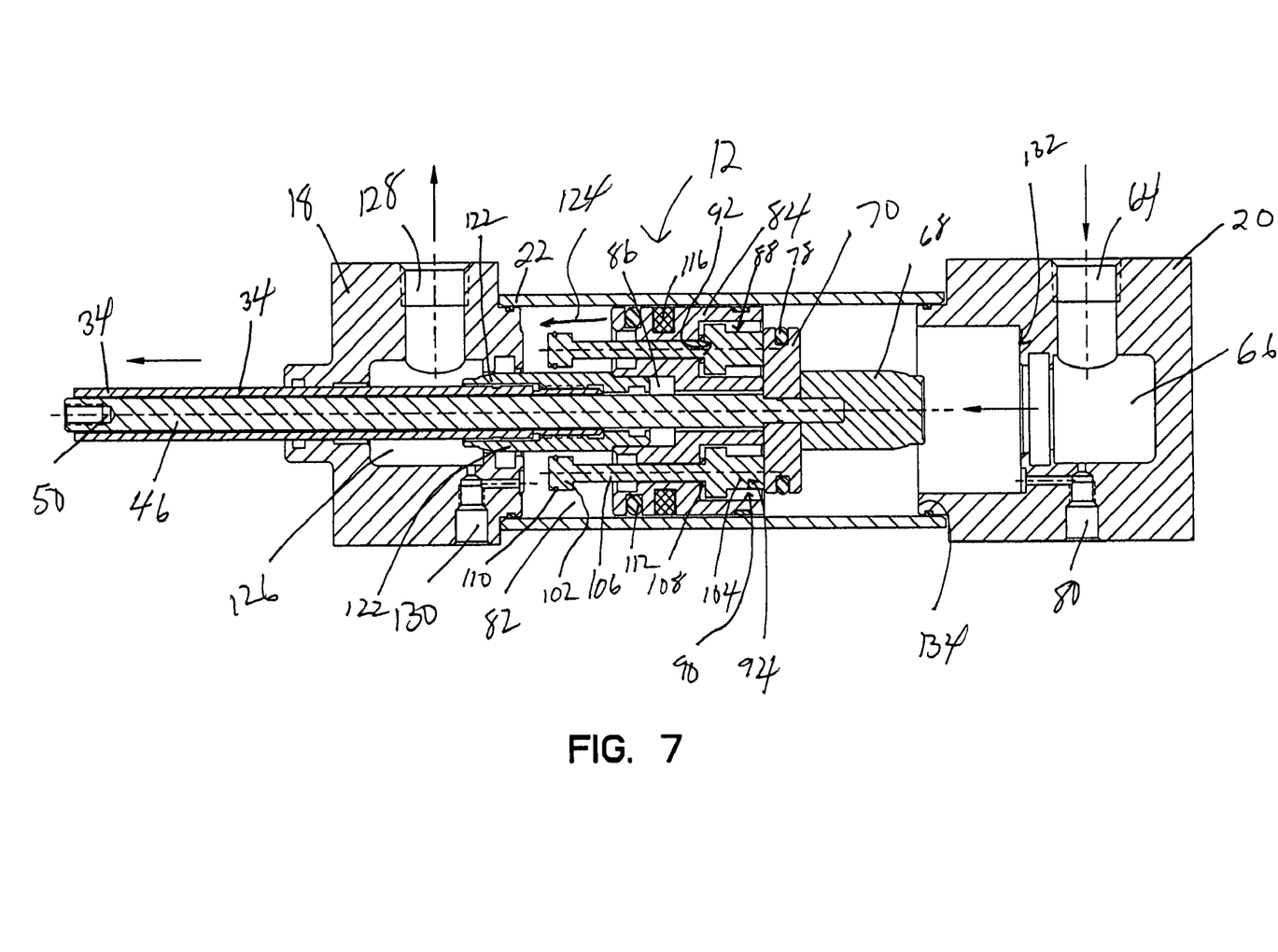
FIG. 7 is a sectional elevational view of the cylinder of FIG. 4 at a mid-stroke extend position.

FIG. 7 is a sectional elevational view of the cylinder 12 at the mid stroke extended position. Now that the inner piston 70 is contacting the outer piston 84 and the rear poppet seals 108 have closed the air flow path through the outer piston 84, the applied fluid pressure through the port 64 acts on both the inner piston 70 and the outer piston 84. The contacting inner piston 70 and outer piston 84 continue to move along the path 124. This air pressure pushes the inner piston and outer piston in unison thereby also moving forward the inner rod 46 and outer rod 34 in unison.

Figure 8:
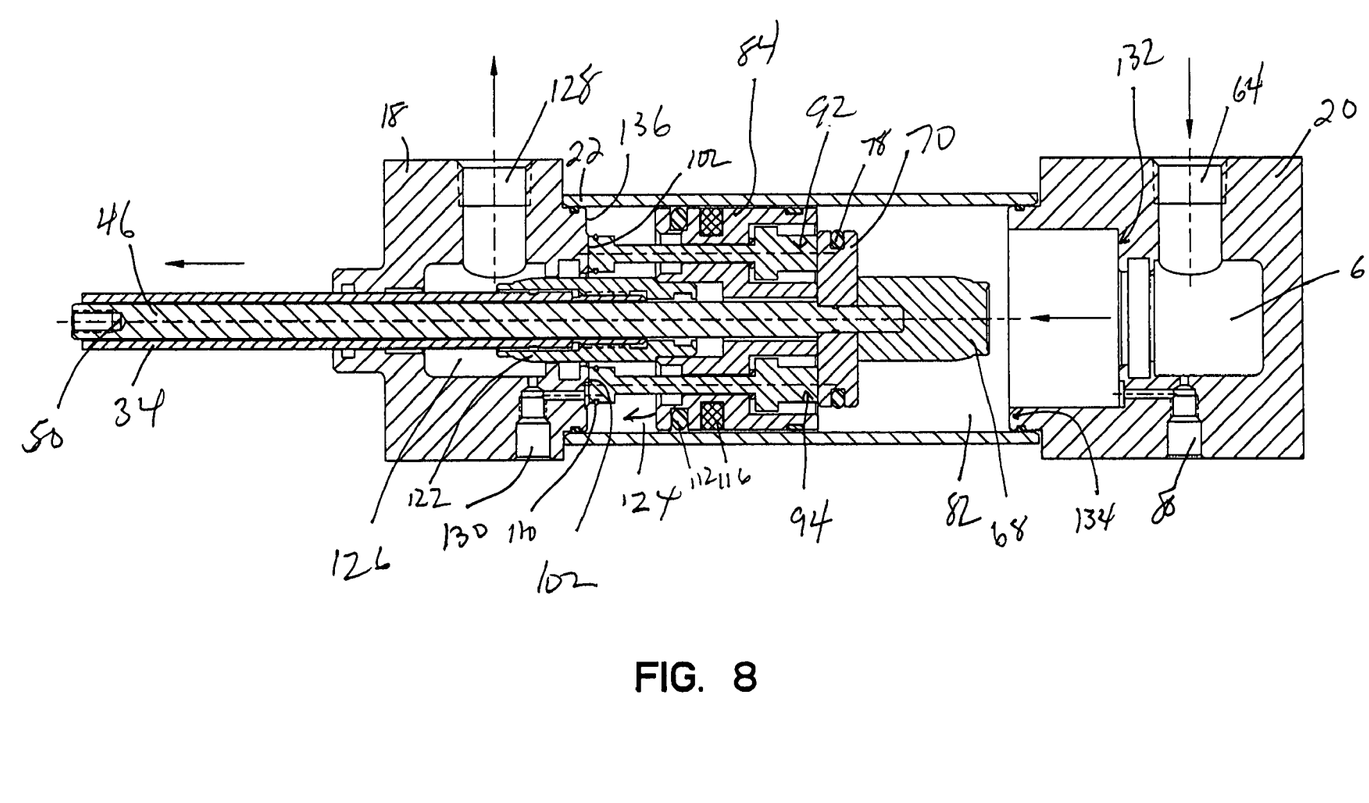
FIG. 8 is a sectional elevational view of the cylinder of FIG. 4 at the end of stroke position.

FIG. 8 is a sectional elevational view of the cylinder 12 at the end of the extend or stroke position. In this position, the front portion 102 of the valves 92 and 94 contact an inner surface 136 of the rod cover 18. Upon contact with the inner surface 136, the valves 92 and 94 are prevented from moving forward. Rear portion 104 of valves 92 and 94 prevent forward movement of the inner piston 70, but the outer piston 84 continues its forward movement in the direction 124.

Figure 9:
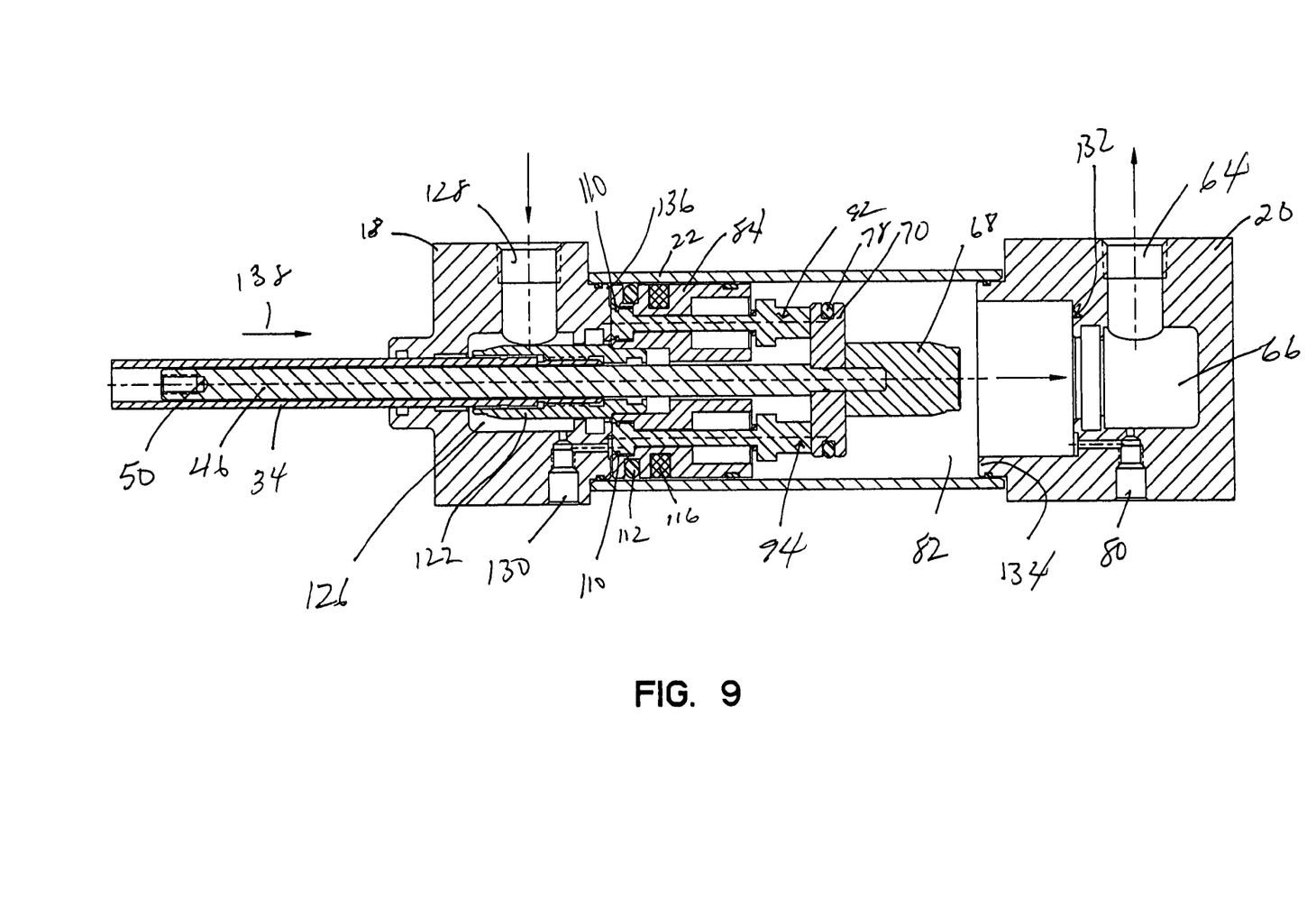
FIG. 9 is a sectional elevational view of the cylinder of FIG. 4 upon the initial application of air pressure to the rod cover.

FIG. 9 illustrates a sectional elevational view of the cylinder 12 upon initial application of air pressure to the rod cover 18 through the port 128. As the outer piston 84 continues to move in the direction 124, the relationship of the valves 92 and 94 with respect to the outer piston 84 changes such that the valves 92 and 94 are retracted within the cavities 90 and 96 of the outer piston 84. The front poppet seals 110 of the respective valves 92 and 94 are engaged within the second chamber or front cavity 98 of the outer piston 84. The front poppet seal 110 creates a pressure seal within the front cavity which closes the air path through the outer piston 84. The air path is sealed through the outer piston 84 when the outer rod 34 reaches full extension. At the point of full extension of the cylinder, the applied fluid pressure is removed from the head cover port 64 and is applied to the rod cover port 128. Once the applied pressure is applied through the port 128 of FIG. 9, the outer piston 84 begins to move in a direction 138. As the air pressure is applied through the port 128 of the rod cover 18, the outer piston 84 and the inner piston 70 move in unison in the direction 138 as further illustrated in FIG. 10.

Figure 10:
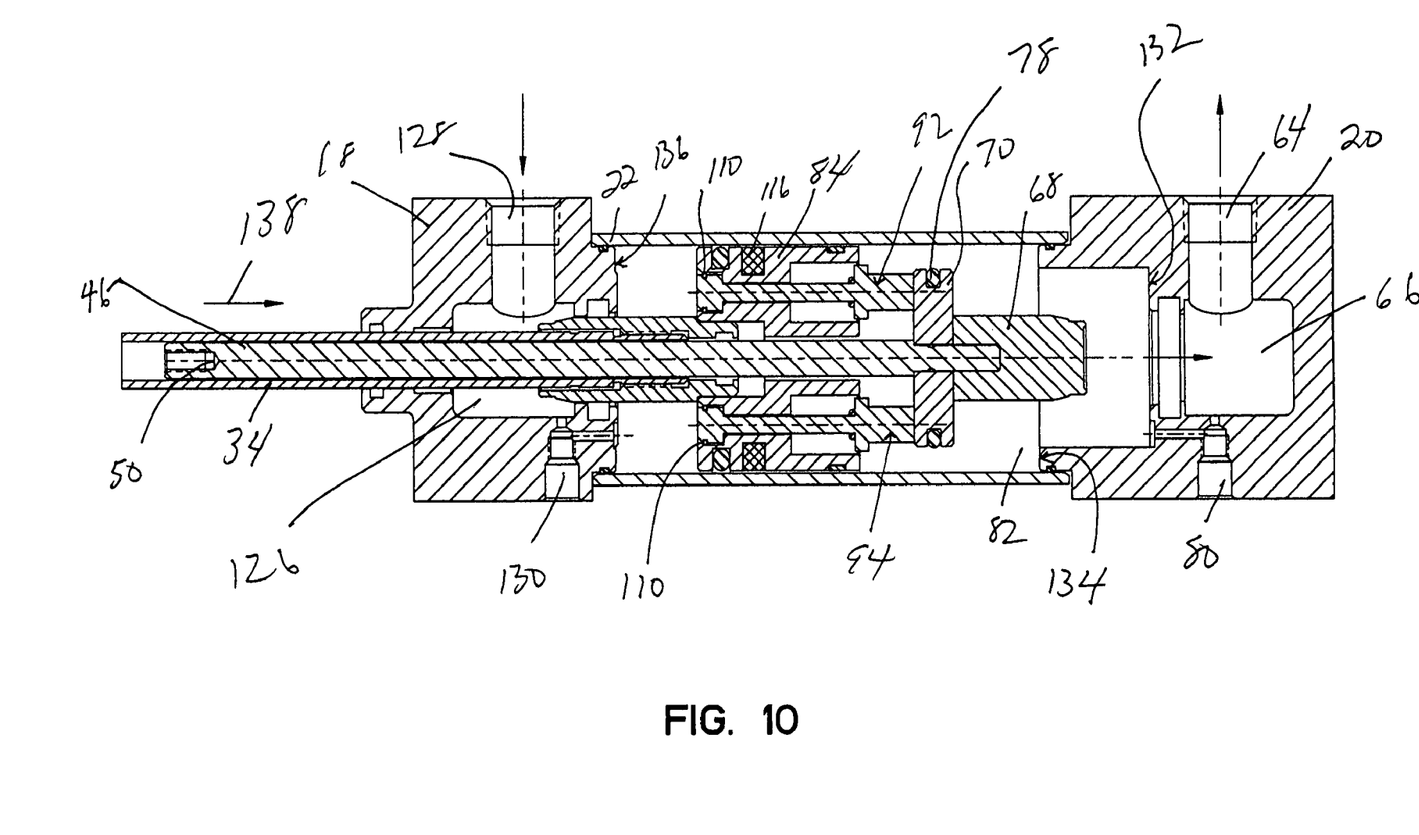
FIG. 10 is a sectional elevational view of the cylinder of FIG. 4 at a mid-stroke retract position.

FIG. 10 is a sectional elevational view of the cylinder 12 at a mid-stroke retractable position. The valves 92 and 94 remain in the seated position such that the inner piston 70 moves with the outer piston 84. The valves 92 and 94 remain in the seated position due to the compression of the valve seals 110. It is also possible to design the front portion 102 of each of the valves 92 and 94 with a detent, not illustrated, such that the seal cannot be broken without the application of a certain predetermined force which is determined by the design features of the valves. As the air pressure is applied to the outer piston 84 and the inner piston 70, the inner piston 70 remains stationary until the valves 92 and 94 make contact with the inner piston 70 thereby pushing the inner piston 70 along with the outer piston 84. During this period of retraction, the outer rod 34 and inner rod 50 travel in unison. Both inner piston 70 and outer piston 84 are pushed toward the head cover 20, where air is expelled through the port 64.

Figure 11:
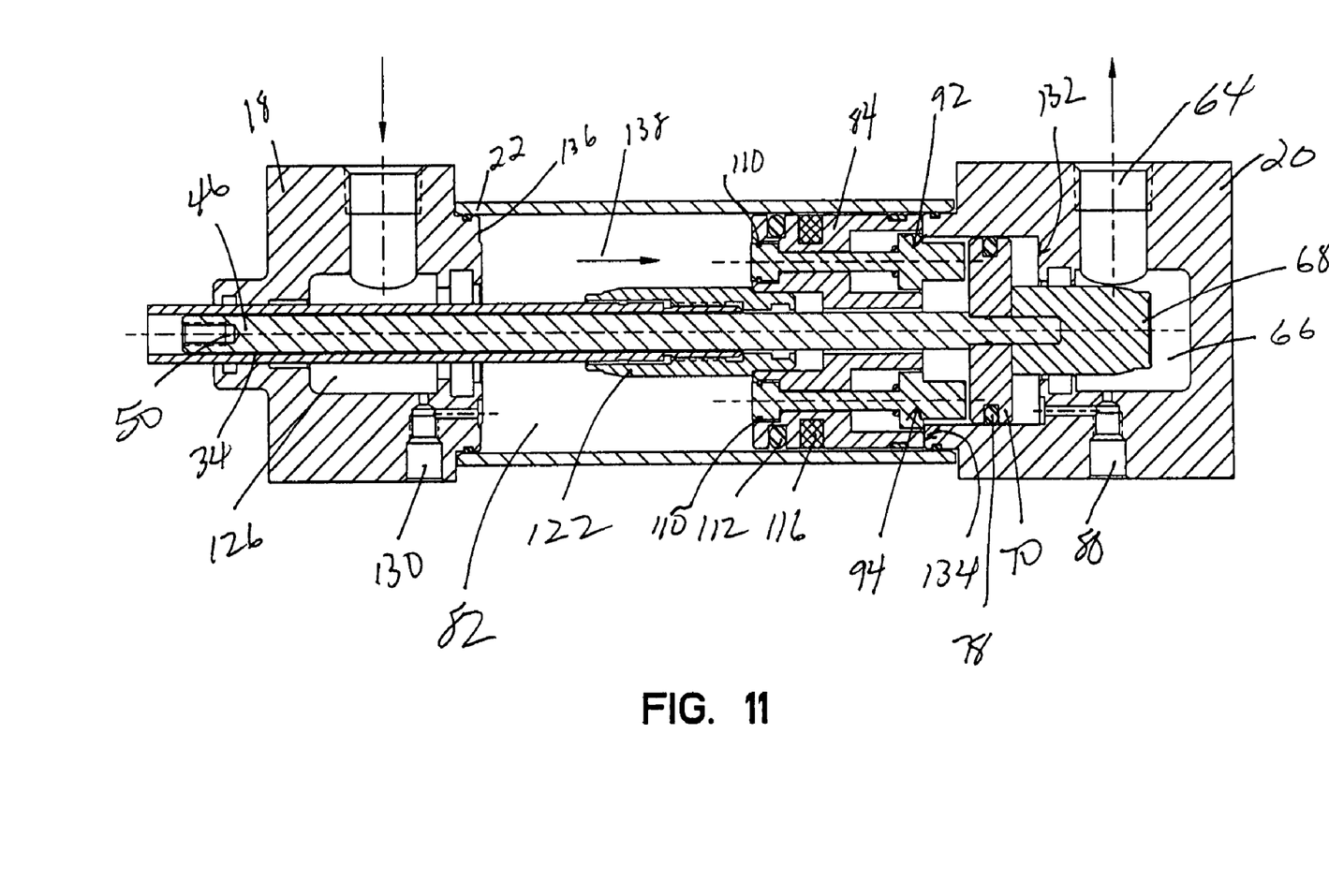
FIG. 11 is a sectional elevational view of the cylinder of FIG. 4 having an outer piston at a fully retracted position.

As the inner piston 70 is pushed towards the head cover 20, it enters the cavity 66 thereby creating a seal with the inner surface of the cavity 66 and the inner piston seal 78 as illustrated in FIG. 11. Once the inner piston 70 sufficiently enters the cavity 66, the surface of the valves 92 and 94 contact the head cover 20 thereby preventing forward movement of the valves 92 and 94. The valves 92 and 94 contact the head cover 20 before the outer piston 84 makes contact with the head cover. As a result, the seal created by the valve seals 110 with the outer piston 84 will open on the side adjacent the rod cover 18 resulting in an air path opening through the outer piston 84. The opening of the air path through the outer piston 84 allows air pressure on the rod cover 18 side of the outer piston 84 to apply air pressure against the inner piston 70 resulting in the inner piston being pushed back against the head cover 20 cavity surface 132. The opening of the air path through the outer piston 84 also allows the volume of air between the inner piston 70 and outer piston 84 to exhaust through the rod cover 18 when the next cycle begins. This exhaustion of air between the inner piston 70 and outer piston 84 helps insure that there is no pressure against the outer piston 84 for the beginning of the next cycle.

Once the valves 92 and 94 contact the head cover 20, the inner piston 84 moves forward until it comes in contact with the head cover 20. The action of the air pressure from the side of the rod cover 18 affects the outer piston 84, thereby pushing the outer piston 84 toward the head cover 20. This action of the valves 92 and 94 control the air flow between the outer piston 84 and inner piston 70. By opening the valve seals 110 and the fact that the valves 92 and 94 contact the head cover before the outer piston 84, the air pressure pushing on the outer piston is allowed to pass through the outer piston 84 and to push the inner piston 70 into the start position. It is also possible to add an aperture or air passage through the inner piston 70, such as a channel or a hole through the piston body, thereby allowing air pressure to pass through and across the inner piston 70. Such an air passage can be used to relieve any back pressure that may occur during the operation of the cylinder. The inner piston 70 is forced to the surface 132 through this continued application of air pressure through the outer piston 84 such that the inner piston 70 becomes seated and contacting with the wall of the head cover 20. The valves 92 and 94 are at this point open and the air path through the outer piston 84 is also opened as well, thereby returning the cylinder to its starting position as illustrated in FIG. 4.

Although the invention has been described with reference to the preferred embodiments, variations and modifications exist within the scope and spirit of the invention as described and defined in the following claims.

What is claimed is:

1. A fluid cylinder comprising:
   a housing including an interior region having a first dimension;
   a cylinder cover, including a cavity having a second dimension less than the first dimension, coupled to the housing;
   a poppet;
   a first piston, located within the housing, including a bore and a dimension larger than the second dimension to prevent the first piston from being disposed within the cavity of the cylinder cover, the first piston further including an aperture to hold the poppet, the aperture being disposed on the first piston to enable at least a portion of the poppet to extend into the cavity;
   a second piston, external to the first piston and adapted to be disposed within the cavity of the cylinder cover; and
   a piston rod coupled to the second piston, the piston rod being disposed for movement through the bore of the first piston, wherein the second piston has a dimension selected to enable a sealing fit within the second dimension but not within the first dimension.

2. The fluid cylinder of claim 1, further comprising another piston rod, including a bore to receive the piston rod coupled to the second piston.

3. The fluid cylinder of claim 2, further comprising a rod cover coupled to the cylinder.

4. The fluid cylinder of claim 3, wherein the poppet includes a contact surface to contact the rod cover to close the aperture of the first piston.

5. The fluid cylinder of claim 4, wherein the poppet includes a length sufficient to stop the second piston from forward movement before the first piston contacts the rod cover.

* * * * *